US012266315B2

(12) United States Patent
Sung et al.

(10) Patent No.: US 12,266,315 B2
(45) Date of Patent: Apr. 1, 2025

(54) DISPLAY DEVICE AND OPERATION METHOD THEREOF

(71) Applicant: SAMSUNG DISPLAY CO., LTD., Yongin-si (KR)

(72) Inventors: Kihyun Sung, Yongin-si (KR); Jongwoon Kim, Yongin-si (KR); Kihong Song, Yongin-si (KR); Hyun-Sik Yoon, Yongin-si (KR); Yeseul Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/298,577

(22) Filed: Apr. 11, 2023

(65) Prior Publication Data

US 2023/0402016 A1 Dec. 14, 2023

(30) Foreign Application Priority Data

Jun. 10, 2022 (KR) ........................ 10-2022-0070959

(51) Int. Cl.

*G09G 3/3275* (2016.01)
*G09G 3/32* (2016.01)

(52) U.S. Cl.

CPC ............. *G09G 3/3275* (2013.01); *G09G 3/32* (2013.01); *G09G 2310/0275* (2013.01); *G09G 2320/0666* (2013.01); *G09G 2330/021* (2013.01); *G09G 2340/06* (2013.01); *G09G 2360/16* (2013.01)

(58) Field of Classification Search

CPC ................... G09G 3/3275; G09G 3/32; G09G 2310/0275; G09G 2320/0666; G09G 2330/021; G09G 2340/06; G09G 2360/16

See application file for complete search history.

(56) References Cited

U.S. PATENT DOCUMENTS

2004/0179002 A1* 9/2004 Park ..................... G09G 3/3648 345/204
2009/0184952 A1* 7/2009 Yoshihama .......... G09G 3/2927 345/212
2022/0051602 A1* 2/2022 Park ......................... G09G 5/06

FOREIGN PATENT DOCUMENTS

KR 10-0438539 7/2004
KR 10-0497344 9/2005
KR 10-1534627 7/2015
KR 10-2022-0020475 2/2022

* cited by examiner

*Primary Examiner* — Kenneth B Lee, Jr.

(74) *Attorney, Agent, or Firm* — F. Chau & Associates, LLC

(57) ABSTRACT

A display device includes a driving control circuit that receives an input image signal and outputs an output image signal, a data driving circuit that outputs a data signal corresponding to the output image signal, and a display panel including a plurality of pixels to display an image corresponding to the data signal. The driving control circuit determines an amount of time the input image signal is maintained as a still image, determines a color coordinate gain based on the amount of time and outputs the output image signal based on the color coordinate gain.

22 Claims, 8 Drawing Sheets

| Wy \ Wx | 0.270 | 0.275 | 0.280 | 0.285 | 0.290 |
|---|---|---|---|---|---|
| 0.275 | 13.53 | 13.39 | 13.25 | 13.12 | 12.99 |
| 0.280 | 13.75 | 13.61 | 13.48 | 13.34 | 13.21 |
| 0.285 | 13.98 | 13.83 | 13.70 | 13.56 | 13.43 |
| 0.290 | 14.20 | 14.06 | 13.92 | 13.78 | 13.64 |
| 0.295 | 14.42 | 14.28 | 14.13 | 13.99 | 13.86 |

DISPLAY DEVICE AND OPERATION METHOD THEREOF

CROSS-REFERENCE TO RELATED APPLICATIONS

This U.S. non-provisional patent application claims priority under 35 U.S.C. § 119 to Korean Patent Application No. 10-2022-0070959 filed on Jun. 10, 2022, the disclosure of which is hereby incorporated by reference in its entirety.

TECHNICAL FIELD

Embodiments of the present disclosure relate to a display device.

DISCUSSION OF RELATED ART

Various electronic devices include a display device for displaying images to a user. Examples of these electronic devices include smartphone, a digital camera, a laptop computer, a navigation system, a monitor, a smart television. The display device generates an image and then provides the user with the generated image through a display screen.

The display device includes a display panel with a plurality of pixels and driving circuits for controlling the plurality of pixels. Each of the plurality of pixels includes a light emitting element and a pixel circuit for controlling the light emitting element. The driving circuit of the pixel may include a plurality of transistors which are organically connected with each other.

The display device may apply a data signal to the display panel for displaying a certain image. Current corresponding to the data signal may be supplied to the light emitting element. However, the display device may consume too much power when displaying still images.

SUMMARY

At least one embodiment of the present disclosure provides a display device with reduced power consumption and an operation method thereof.

According to an embodiment, a display device includes a driving control circuit that receives an input image signal and outputs an output image signal, a data driving circuit that outputs a data signal corresponding to the output image signal, and a display panel including a plurality of pixels to display an image corresponding to the data signal. The driving control circuit determines an amount of time the input image signal is maintained as a still image, determines a color coordinate gain based on the amount of time and outputs the output image signal based on the color coordinate gain.

In an embodiment, the driving control circuit may include a still image determiner (e.g., a logic circuit) that outputs a still image signal of an active level when the input image signal is the still image, a counter that counts the amount of time when the still image signal is maintained in the active level and outputs a count signal based on the amount of time, a color coordinate gain calculator that calculates the color coordinate gain based on the count signal and outputs a color coordinate gain signal corresponding to the color coordinate gain, and an output circuit that converts the input image signal into the output image signal in response to the color coordinate gain signal.

In an embodiment, the color coordinate gain calculator may output the color coordinate gain signal corresponding to first color coordinates, when a count value of the count signal is less than or equal to a first color coordinate count value, and may output the color coordinate gain signal corresponding to the count value of the count signal, when the count signal is greater than the first color coordinate count value and is less than or equal to a second color coordinate count value.

In an embodiment, the color coordinate gain calculator may output the color coordinate gain signal corresponding to second color coordinates, when the count value of the count signal is greater than the second color coordinate count value.

In an embodiment, the color coordinate gain signal may correspond to color coordinates between the first color coordinates and the second color coordinates, when the count value of the count signal is greater than the first color coordinate count value and is less than or equal to the second color coordinate count value.

In an embodiment, the second color coordinates may be coordinates moving in a greenish direction from the first color coordinates in a color space.

In an embodiment, the color coordinate gain signal may include a first color coordinate gain signal corresponding to an x-coordinate of a color space and a second color coordinate gain signal corresponding to a y-coordinate of the color space.

According to an embodiment, a display device includes a driving control circuit that receives an input image signal and outputs an output image signal, a data driving circuit that outputs a data signal corresponding to the output image signal, and a display panel including a plurality of pixels to display an image corresponding to the data signal. The driving control circuit determine an amount of time the input image signal is maintained as a still image, determines a luminance gain and a color coordinate gain corresponding from the amount of time and outputs the output image signal based on the luminance gain and the color coordinate gain.

In an embodiment, the driving controller may include a still image determiner (e.g., a logic circuit) that outputs a still image signal of an active level when the input image signal is the still image, a counter that counts the amount of time when the still image signal is maintained in the active level and outputs a count signal based on the amount of time, a luminance gain calculator (e.g., a first calculator or first logic circuit) that calculates the luminance gain based on the count signal and outputs a luminance gain signal corresponding to the luminance gain, a color coordinate gain calculator (e.g., a second calculator or second logic circuit) that calculates the color coordinate gain based on the count signal and outputs a color coordinate gain signal corresponding to the color coordinate gain, and an output circuit that converts the input image signal into the output image signal in response to the color coordinate gain signal.

In an embodiment, the luminance gain calculator may output the luminance gain signal corresponding to a first luminance gain level, when a count value of the count signal is less than or equal to a first luminance count value, and may output the luminance gain signal corresponding to the count value of the count signal, when the count value of the count signal is greater than the first luminance count value and is less than or equal to a second luminance count value.

In an embodiment, the luminance gain calculator may output the luminance gain signal corresponding to a second luminance gain level, when the count value of the count signal is greater than the second luminance count value.

In an embodiment, the luminance gain signal may correspond to a luminance gain level between the first luminance gain level and the second luminance gain level, when the count value of the count signal is greater than the first luminance count value and is less than or equal to the second luminance count value.

In an embodiment, the color coordinate gain calculator may output the color coordinate gain signal corresponding to first color coordinates, when the count value of the count signal is less than or equal to a first color coordinate count value, and may output the color coordinate gain signal corresponding to the count value of the count signal, when the count value of the count signal is greater than the first color coordinate count value and is less than or equal to a second color coordinate count value.

In an embodiment, the color coordinate gain calculator may output the color coordinate gain signal corresponding to second color coordinates, when the count value of the count signal is greater than the second color coordinate count value.

In an embodiment, the color coordinate gain signal may correspond to color coordinates between the first color coordinates and the second color coordinates, when the count value of the count signal is greater than the first color coordinate count value and is less than or equal to the second color coordinate count value.

In an embodiment, the second color coordinates may be coordinates moving in a greenish direction from the first color coordinates in a color space.

In an embodiment, the color coordinate gain signal may include a first color coordinate gain signal corresponding to an x-coordinate of a color space and a second color coordinate gain signal corresponding to a y-coordinate of the color space.

According to an embodiment, an operation method of a display device includes determining whether an input image signal is a still image, counting, by a counter, an amount of time the input image signal is maintained as the still image to generate a count signal, calculating a color coordinate gain based on the count signal, and converting the input image signal into an output image signal based on the color coordinate gain.

In an embodiment, the operation method may further include calculating a luminance gain based on the count signal and converting the input image signal into the output image signal based on the luminance gain and the color coordinate gain.

In an embodiment, the calculating of the color coordinate gain based on the count signal may include calculating the color coordinate gain such that color coordinates move in a greenish direction in a color space as a count value of the count signal increases.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
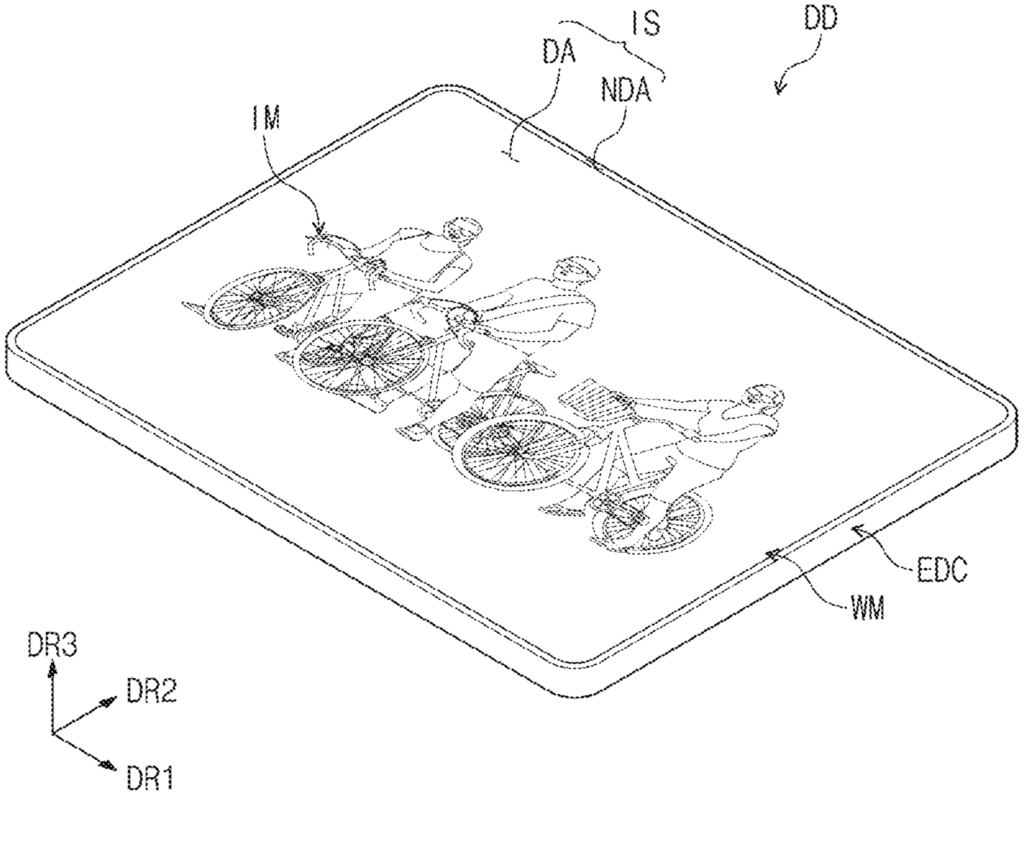
FIG. 1 is a perspective view of a display device according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like elements. The expression "and/or" includes all combinations of one or more of the associated listed items.

Although the terms such as "first", "second", or the like may be used herein to describe various elements, these elements should not be limited by these terms. These terms are only used to distinguish one component from another component. For example, a first component could be termed a second component without departing from the scope of the claims of the present disclosure, and similarly a second component could be termed a first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. These terms are relative concepts and are described on the basis of the directions shown in the drawings.

It should be further understood that the terms "includes/comprises" or "have" etc. specify the presence of stated features, integers, steps, operations, elements, parts, or combinations thereof, but do not preclude the possibility of the presence or addition of one or more other features, integers, steps, operations, elements, parts or combinations thereof.

Hereinafter, embodiments of the present disclosure will be described with reference to the accompanying drawings.

FIG. 1 is a perspective view of a display device according to an embodiment of the present disclosure.

Referring to FIG. 1, a display device DD may be a device activated according to an electrical signal. The display device DD according to the present disclosure may be a large-size display device, such as a television or a monitor, or a small-to-medium size display device, such as a mobile phone, a tablet, a laptop, a vehicle navigation system, or a game console. The above are merely provided as examples since the display device DD may include another type of display device without departing from the inventive concept of the present disclosure.

The display device DD is in the shape of a rectangle which has a long edge in a first direction DR1 and has a short edge in a second direction DR2 crossing the first direction DR1. However, the shape of the display device DD is not limited thereto, and the display device DD may be provided in various shapes. The display device DD may display an image IM in a third direction DR3 on a display surface IS parallel to each of the first direction DR1 and the second direction DR2. The display surface IS on which the image IM is displayed may correspond to a front surface of the display device DD.

In an embodiment, a front surface (or an upper surface) and a rear surface (or a lower surface) of each member are defined with respect to a direction in which the image IM is displayed. The front surface and the rear surface may be opposing to each other in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Directions indicated by the first, second, and third directions DR1, DR2, and DR3 may be changed to different directions in another embodiment.

The display device DD may detect an external input applied from the outside. The external input may include various types of inputs provided from the outside of the display device DD. The display device DD according to an embodiment of the present disclosure may detect an external input of the user, which is applied from the outside. The external input of the user may include any one of various types of external inputs, such as a part of a user's body, light, heat, a gaze, or pressure, or the combination thereof. Furthermore, the display device DD may detect the external input of the user, which is applied to the side surface or the rear surface of the display device DD depending on the structure of the display device DD, but is not limited thereto. As an example of the present disclosure, the external input may include an input by an input device (e.g., a stylus pen, an active pen, a touch pen, an electronic pen, an E-pen, or the like).

The display surface IS of the display device DD may be divided into a display area DA and a non-display area NDA. The display area DA may be an area in which the image IM is displayed. The user views the image IM through the display area DA. In an embodiment, the display area DA is illustrated in the shape of a rectangle, vertices of which are rounded. However, this is merely an example since embodiments of the inventive concept are not limited thereto. For example, the display area DA may have various shapes different from the shape of a rectangle.

The non-display area NDA may be adjacent to the display area DA. The non-display area NDA may have a certain color. The non-display area NDA may surround the display area DA. Thus, the shape of the display area DA may be defined substantially by the non-display area NDA. However, this is merely an example since embodiments of the inventive concept are not limited thereto. The non-display area NDA may be disposed adjacent to only one side of the display area DA or may be omitted. The display device DD may further include an external case EDC for accommodating components of the display device. The external case EDC may be combined with a window WM to define the appearance of the display device DD. The external case EDC may absorb impact applied from the outside and may protect the components contained in the external case EDC by preventing foreign matter/moisture from penetrating. The window WM may be made of a transparent material capable of emitting an image. For example, the window member WM may be made of glass, sapphire, plastic, or the like. The window WM is illustrated as a single layer, but is not limited thereto and may include a plurality of layers.

Figure 2:
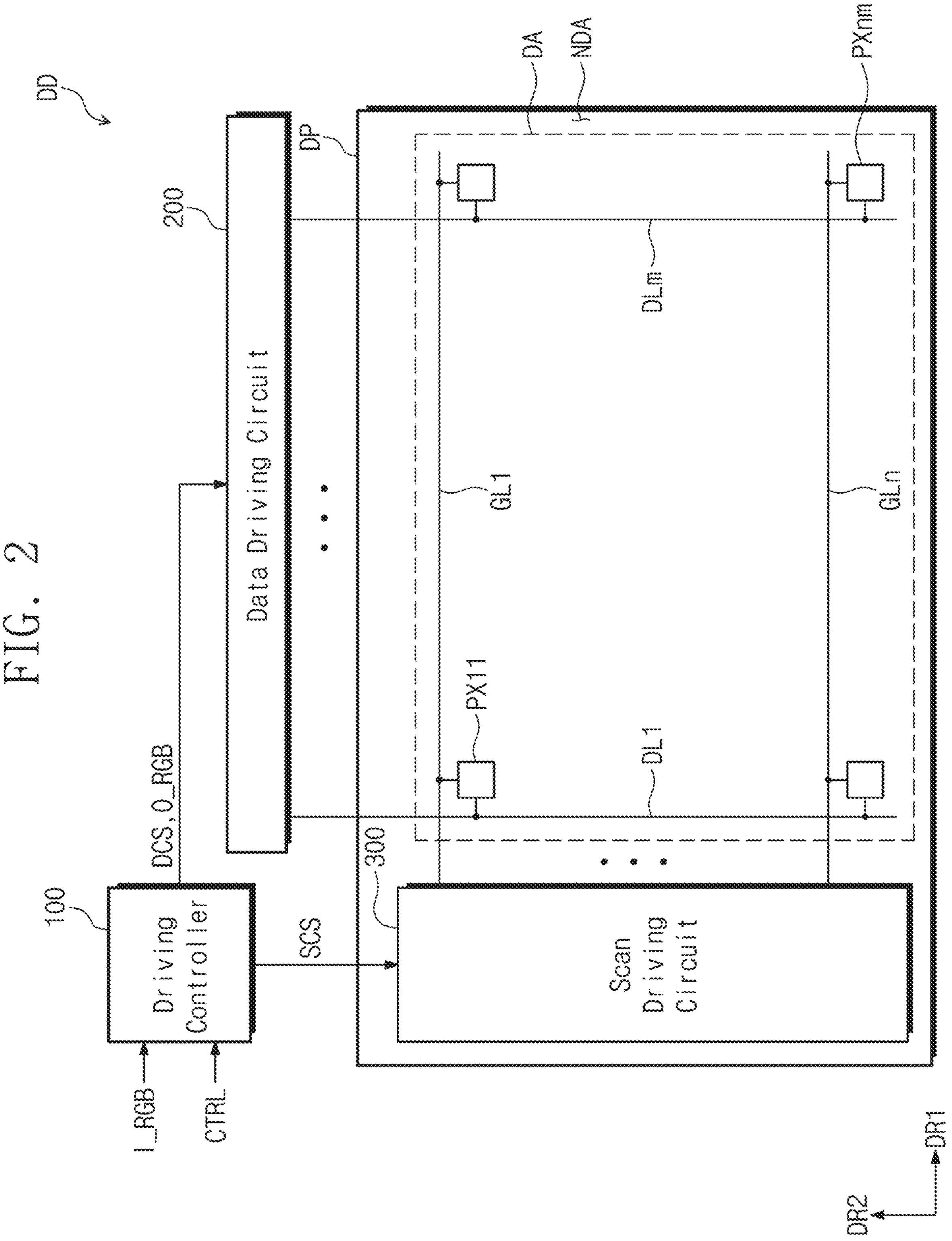
FIG. 2 is a block diagram of a display device according to an embodiment of the present disclosure.

FIG. 2 is a block diagram of a display device according to an embodiment of the present disclosure.

Referring to FIG. 2, a display device DD includes a driving controller 100 (e.g., a control circuit), a data driving circuit 200, and a display panel DP.

The driving controller 100 may receive an input image signal I_RGB and a control signal CTRL. The driving controller 100 may generate an output image signal O_RGB in a data format suitable with interface specifications with the data driving circuit 200. For example, the driving controller 100 may convert the input image signal I_RGB into the output image signal O_RGB having the data format. The driving controller 100 may output a scan control signal SCS and a data control signal DCS.

The data driving circuit 200 may receive the data control signal DCS and the output image signal O_RGB from the driving controller 100. The data driving circuit 200 may convert the output image signal O_RGB into data signals and may output the data signals to a plurality of data lines DL1-DLm which will be described below. In an embodiment, the data signals refer to analog voltages corresponding to a gray level of the output image signal O_RGB.

The display panel DP according to an embodiment of the present disclosure may be a light emitting display panel. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, and the like. Hereinafter, in an embodiment, the display panel DP will be described as the organic light emitting display panel.

The display panel DP may include scan lines GL1-GLn, data lines DL1-DLm, and pixels PX11-PXnm. The display panel DP may further include a scan driving circuit 300. The scan lines GL1-GLn may extend in a first direction DR1 from the scan driving circuit 300. In an embodiment, the scan driving circuit 300 may be disposed at one side of the display panel DP. However, embodiments of the present disclosure are not limited thereto.

The driving controller 100, the data driving circuit 200, and the scan driving circuit 300 may be driving circuits for providing the pixels PX11-PXnm with a data signal corresponding to the input image signal I_RGB of the display panel DP.

The pixels PX11-PXnm may be arranged in a display area DA of the display panel DP, and the scan driving circuit 300 may be disposed in a non-display area NDA.

The scan lines GL1-GLn may extend in the first direction DR1 from the scan driving circuit 300 and may be arranged spaced apart from each other in the second direction DR2. The data lines DL1-DLm may extend in a direction opposite to the second direction DR2 from the data driving circuit 200 and may be arranged spaced apart from each other in the first direction DR1.

Each of the plurality of pixels PX11-PXnm may be connected with a corresponding scan line among the scan lines GL1-GLn and may be connected with a corresponding data line among the data lines DL1-DLm. FIG. 2 illustrates that each of the plurality of pixels PX11-PXnm is connected to one scan line, but embodiments of the present disclosure are not limited thereto. For example, each of the plurality of pixels PX11-PXnm may be electrically connected with two or more scan lines.

Each of the plurality of pixels PX11-PXnm may include a light emitting element (not illustrated) and a pixel circuit part which controls light emission of the light emitting element. In an embodiment, the light emitting element may be an organic light emitting diode. However, embodiments of the present disclosure are not limited thereto. In an embodiment, the pixel circuit part may include a plurality of transistors and/or a capacitor.

The scan driving circuit 300 may receive the scan control signal SCS from the driving controller 100. The scan driving circuit 300 may output scan signals to the scan lines GL1-GLn in response to the scan control signal SCS. In an embodiment, the scan driving circuit 300 may be formed using the same process as the pixel circuit part in the pixel.

Figure 3:
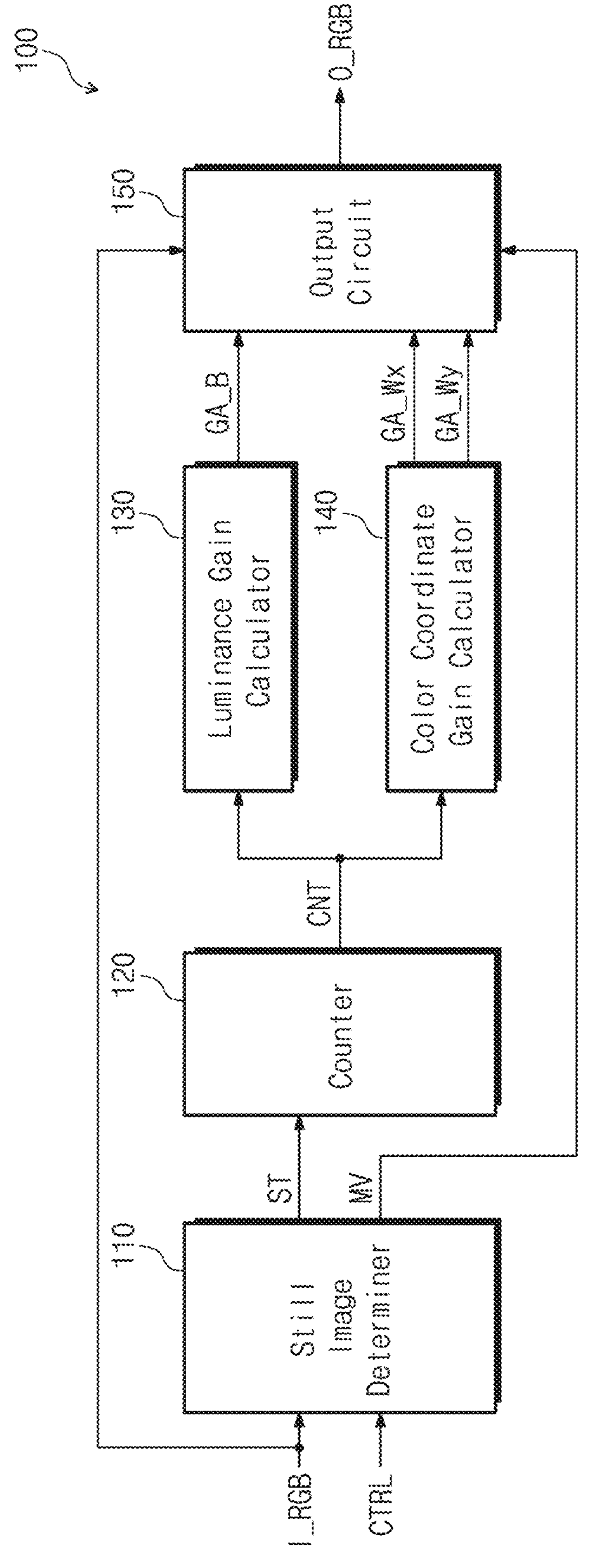
FIG. 3 is a block diagram illustrating a configuration of a driving controller according to an embodiment of the present disclosure.

FIG. 3 is a block diagram illustrating a configuration of a driving controller 100 according to an embodiment of the present disclosure.

Referring to FIGS. 2 and 3, the driving controller 100 may include a still image determiner 110 (e.g., a logic circuit), a counter 120 (e.g., a counter circuit), a luminance gain calculator 130 (e.g., a logic circuit), a color coordinate gain calculator 140 (e.g., a logic circuit), and an output circuit 150.

The still image determiner 110 may receive an input image signal I_RGB and a control signal CTRL from the outside (e.g., an application processor, a graphics card, a host processor, or the like).

The still image determiner 110 may determine whether the input image signal I-RGB of a current frame (or frame period) is a still image or a moving image based on the input image signal I-RGB and the control signal CTRL. In an embodiment, when a difference value between the input image signal I_RGB of the current frame and the input image signal I_RGB of a previous frame (or frame period) is less than a certain reference value, the still image determiner 110 may determine that the input image signal I-RGB of the current frame is the still image. In an embodiment, the control signal CTRL may include a synchronous signal indicating the start of one frame.

The still image determiner 110 may include a memory for storing the input image signal I-RGB of the previous frame, but embodiments of the present disclosure are not limited thereto. In an embodiment, the memory for storing the input image signal I-RGB of the previous frame may be disposed outside the driving controller 100.

When the input image signal I-RGB of the current frame is determined as any one of the still image and the moving image, the still image determiner 110 may output any one of a still image signal ST and a moving image signal MV in an active level and may output the other in an inactive level. For example, may output a still image signal ST having a first logic level and output the moving image signal MV having a second logic level different from the first logic level when the current frame is a still image.

In an embodiment, when the input image signal I_RGB of the current frame is determined as the still image, the still image determiner 110 may output the still image signal ST in the active level and may output the moving image signal MV in the inactive level.

In an embodiment, when the input image signal I_RGB of the current frame is determined as the moving image, the still image determiner 110 may output the still image signal ST in the inactive level and may output the moving image signal MV in the active level.

The still image signal ST output from the still image determiner 110 may be provided to the counter 120, and the moving image signal MV may be provided to the output circuit 150.

The counter 120 may count a time when the still image signal ST is maintained in the active level. In an embodiment, the counter 120 may count a time when the still image signal ST is maintained in the active level in synchronization with an internal clock signal. For example, a value of the counter 120 may be initially reset to 0, and then incremented each time a rising (or falling) edge of the internal clock signal occurs and the still image signal ST has the active level, and then a resulting value of the counter 120 may be used to determine the time. In an embodiment, the counter 120 may count a time when the still image signal ST is maintained in the active level in synchronization with a synchronous signal or a clock signal included in the control signal CTRL.

The counter 120 may output a count signal CNT corresponding to the time when the still image signal ST is maintained in the active level. In other words, the counter 120 may output the count signal CNT corresponding to a time when the still image is displayed on a display panel DP. For example, the time may be determined from the count signal CNT. For example, the counter signal CNT may include a value of the counter 120.

The count signal CNT output from the counter 120 may be provided to the luminance gain calculator 130 and the color coordinate gain calculator 140.

The luminance gain calculator 130 may calculate a luminance gain based on the count signal CNT and may output a luminance gain signal GA_B. The luminance gain signal GA_B may include or indicate the luminance gain.

The color coordinate gain calculator 140 may calculate color coordinate gains based on the count signal CNT and may output color coordinate gain signals GA_Wx and GA_Wy.

The output circuit 150 may receive the input image signal I_RGB and may output an output image signal O_RGB based on the luminance gain signal GA_B, the color coordinate gain signals GA_Wx and GA_Wy, and the moving image signal MV.

In an embodiment, when the moving image signal MV is in the active level to indicate the current frame is a moving image, the output circuit 150 sets a luminance gain to a predetermined value (e.g., a maximum luminance value) and sets a color coordinate gain to the predetermined value.

When the moving image signal MV is in the active level, the output circuit 150 may convert the input image signal I_RGB into the output image signal O_RGB based on the luminance gain of the predetermined value and the color coordinate gains, each of which has the predetermined value.

In an embodiment, when the moving image signal MV is in the inactive level to indicate the current frame is a still image, the output circuit 150 converts the input image signal I_RGB into the output image signal O_RGB based on a luminance gain corresponding to the luminance gain signal GA_B and color coordinate gains corresponding to the color coordinate gain signals GA_Wx and GA_Wy.

A detailed operation of the driving controller 100 illustrated in FIG. 3 will be described in detail below.

Figure 4:
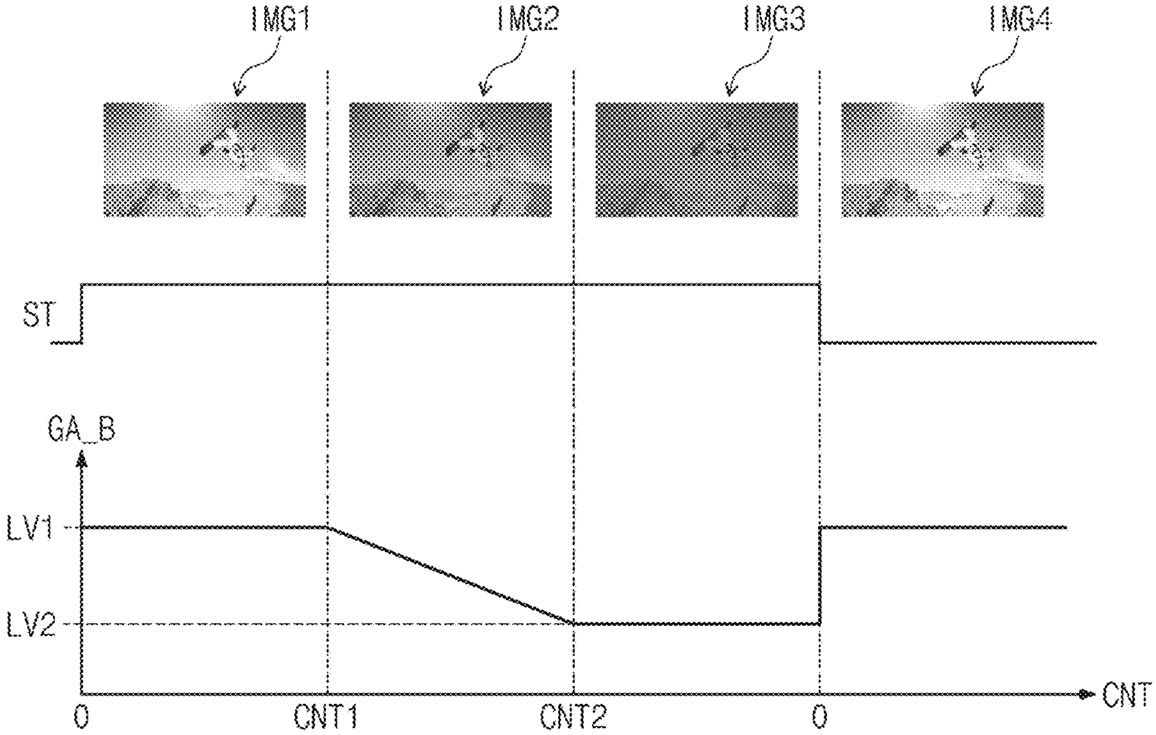
FIG. 4 is a view illustrating a change in luminance gain signal according to a count signal.

FIG. 4 is a view illustrating a change in luminance gain signal GA_B according to a count signal CNT.

Referring to FIGS. 2, 3, and 4, when an input image signal I_RGB of a current frame is determined as a still image, a still image determiner 110 may output a still image signal ST of an active level (e.g., a high level). A counter 120 may output a count signal CNT corresponding to a time when the still image signal ST is maintained in the active level. For example, the count signal CNT may indicate how long a still image has been displayed.

When a count value of the count signal CNT is less than or equal to a first luminance count value CNT1, a luminance gain calculator 130 may output a luminance gain signal GA_B of a first luminance gain level LV1. The first luminance gain level LV1 may be a predetermined maximum value.

In other words, when a time when the still image signal ST is maintained in the active level (e.g., the high level) is less than or equal to a first luminance count value CNT1, a driving controller 100 may maintain a luminance level of an output image signal O_RGB as a moving image level.

When the count signal CNT is greater than the first luminance count value CNT1 and is less than or equal to a second luminance count value CNT2, the luminance gain calculator 130 may output a luminance gain signal GA_B which is less than the first luminance gain level LV1 and is greater than a second luminance gain level LV2. In an embodiment, in an interval where a count value of the count signal CNT is greater than the first luminance count value CNT1 and is less than or equal to the second luminance count value CNT2, the luminance gain signal GA_B may be reduced gradually (e.g., stage by stage or linearly).

In an embodiment, the luminance gain calculator 130 may calculate a luminance gain corresponding to a count value of the count signal CNT by means of a predetermined equation and may output the luminance gain signal GA_B corresponding to the calculated luminance gain.

In an embodiment, the luminance gain calculator 130 may store the luminance gain corresponding to the count value of the count signal CNT in a lookup table and may output the luminance gain signal GA_B corresponding to the luminance gain read from the lookup table.

When the counter value of the count signal CNT is greater than the second luminance count value CNT2, the luminance gain calculator 130 may output the luminance gain signal GA_B of the second luminance gain level LV2. In an embodiment, the second luminance gain level LV2 may correspond to minimum luminance allowed by a display panel DP. In an embodiment, the second luminance gain level LV2 may correspond to a luminance level which is predetermined by a user.

When the input image signal I_RGB of the current frame is determined as a moving image, the still image determiner 110 may output a still image signal ST of an inactive level (e.g., a low level). When the still image signal ST is transitioned from the active level to the inactive level, the count value of the count signal CNT output from the counter 120 may be reset to "0".

When the count value of the count signal CNT is "0", the luminance gain calculator 130 may calculate the luminance gain signal GA_B of the first luminance gain level LV1. In other words, when the input image signal I_RGB of the current frame is determined as a moving image, the driving controller 100 may return the luminance level of the output image signal O_RGB to the moving image level.

It is assumed that Images IMG1, IMG2, and IMG3 illustrated in FIG. 4 are still images and an image IMG4 is a moving image.

When the count value of the count signal CNT is less than or equal to the first luminance count value CNT1, a luminance level of the image IMG1 may be in the same moving image level as a luminance level of the image IMG4 which is the moving image.

As the count value of the count signal CNT increases, luminances of the images IMG2 and IMG3 may decrease gradually.

When the count signal CNT has any one of values which are greater than the first luminance count value CNT1 and are less than or equal to the second luminance count value CNT2, the image IMG2 illustratively shows a luminance level corresponding to a luminance gain level between the first luminance gain LV1 and the second luminance gain LV2.

A luminance level of the image IMG3 may correspond to a predetermined minimum level.

After the count value of the count signal CNT is reset to "0", the luminance level of the image IMG4 which is the moving image may be a moving image level.

Power consumption of a display device DD may be reduced by gradually reducing the luminance levels of the images IMG2 and IMG3 displayed on the display panel DP when the still image is maintained for a long time.

Due to characteristics of a light emitting element and a transistor included in each of pixels PX11-PXnm, after a first image corresponding to a certain data signal is displayed for a long time on the display panel DP, when a new image different from the first image, that is, a second image is displayed, the first image may affect the second image. The higher the luminance of the first image and the longer the display time of the first image, the more severe an afterimage phenomenon may be.

As illustrated in FIG. 4, power consumption of the display device DD may be reduced by reducing a luminance level of an image displayed on the display panel DP when the still images IMG1, IMG2, and IMG3 are displayed for a long time.

Figure 5:
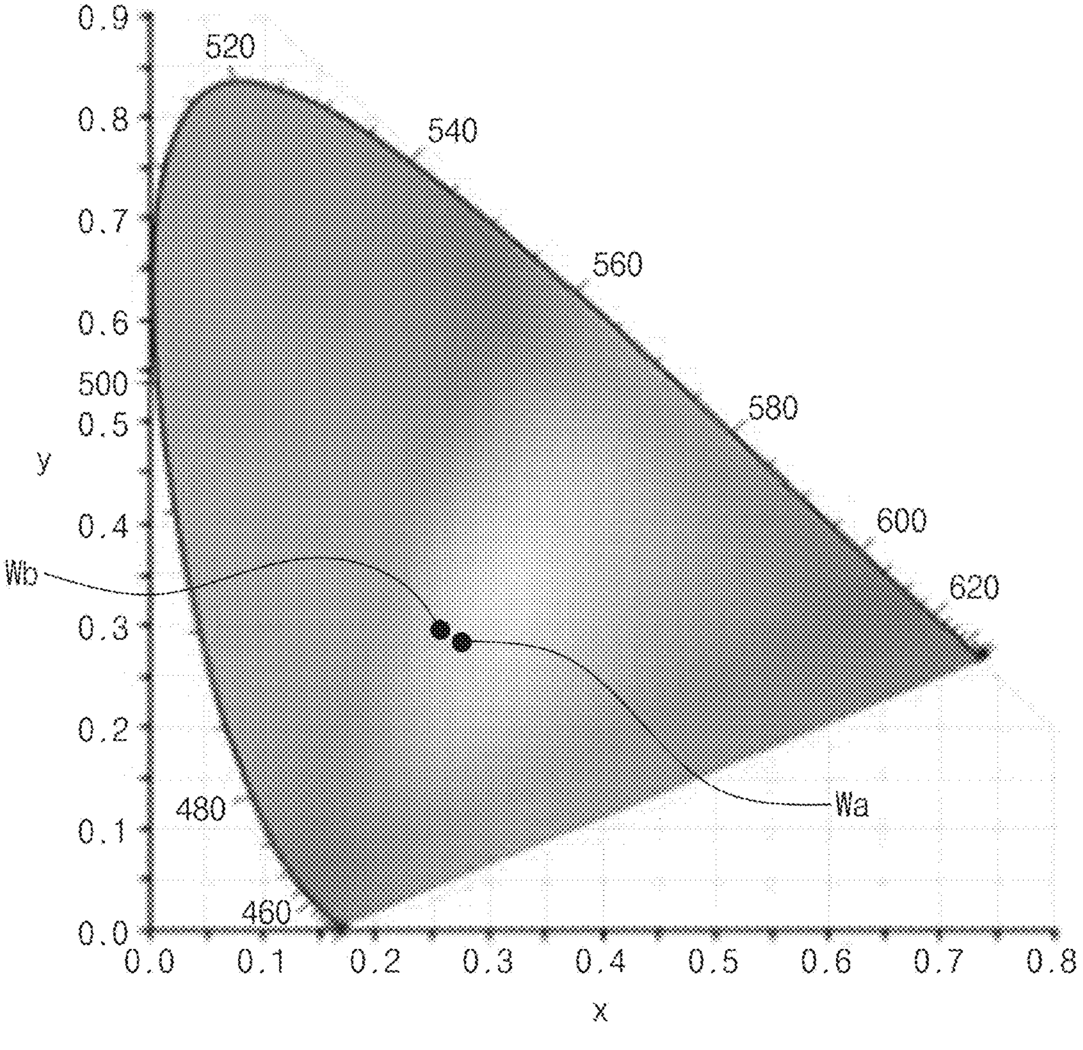
FIG. 5 is a view illustrating a CIE 1931 (x, y) color space.

FIG. 5 is a view illustrating a CIE 1931 (x, y) color space.

Referring to FIGS. 1 and 5, in an embodiment, when a moving image is displayed on a display panel DP, white color coordinates may be first color coordinates Wa. In an embodiment, when a still image is displayed on the display panel DP, the white color coordinates may be second color coordinates.

Figures 6, 7:
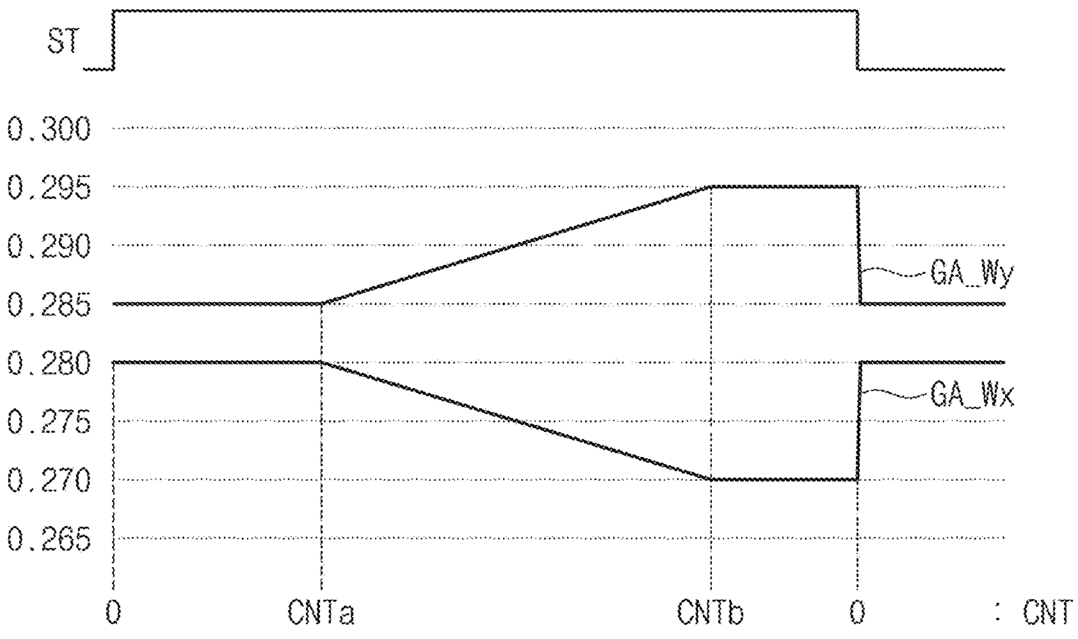
FIG. 6 is a view illustrating current efficiency according to white color coordinates.
FIG. 7 is a view illustrating a change in color coordinate gain signals according to a count signal.

FIG. 6 is a view illustrating current efficiency according to white color coordinates.

In FIG. 6, Wx is an x-coordinate of a color space illustrated in FIG. 5 and Wy is a y-coordinate of the color space illustrated in FIG. 5. A unit of current efficiency is candela/ampere (cd/A).

Referring to FIGS. 2, 5, and 6, pixels PX11-PXnm may be divided into a red pixel, a green pixel, and a blue pixel according to a light emitting color. In an embodiment, current efficiency of the red pixel, the green color, and the blue color may be 7 cd/A, 33 cd/A, and 3.42 cd/A, respectively. In the example, the current efficiency of the green pixel among the red pixel, the green pixel, and the blue pixel is overwhelmingly excellent or much higher than the current efficiency of the red pixel and the blue pixel. The current efficiency refers to a luminance of the pixels PX11-PXnm according to current corresponding to a data signal provided to the pixels PX11-PXnm.

As illustrated in FIG. 5, when the white color coordinates (Wx, Wy) are (0.280, 0.285), that is, when the white color coordinates (Wx, Wy) change from the first color coordinates Wa to (0.270, 0.295), that is, the second color coordinates Wb, they move in a greenish direction. When the white color coordinates (Wx, Wy) move in the greenish direction, an image displayed on the display panel DP may be highlighted in a green color. When the green pixel among the pixels PX11-PXnm is more highlighted, a luminance of the image displayed on the display panel DP may increase.

As illustrated in FIG. 6, when the white color coordinates (Wx, Wy) change from (0.280, 0.285) to (0.270, 0.295), the current efficiency of the pixels PX11-PXnm increases from 13.70 cd/A to 14.42 cd/A by about 5%. The increase in current efficiency refers to an increase in the luminance of the pixels PX11-PXnm even though levels of current corresponding to a data signal provided to the pixels PX11-PXnm are the same as each other.

Because there is the increase in the luminance of the image as the white color coordinates (Wx, Wy) change from (0.280, 0.285) to (0.270, 0.295), even though the data signal provided to the pixels PX11-PXnm changes to a lower gray level, the minimum luminance allowed by the display panel DP may be satisfied. Therefore, the power consumption of the display device DD may be reduced.

FIG. 7 is a view illustrating a change in color coordinate gain signals GA_Wx and GA_Wy according to a count signal CNT.

Referring to FIGS. 2, 3, 5, 6 and 7, when an input image signal I_RGB of a current frame is determined as a still image, a still image determiner 110 may output a still image signal ST of an active level (e.g., a high level). A counter 120 may output a count signal CNT corresponding to a time when the still image signal ST is maintained in the active level. For example, the counter 120 may count an amount of time the input image signal I_RGB is maintained as a still image and generate the count signal CNT so the amount of time can be derived from the count signal CNT. For example, the count signal CNT may include a count value or a number of counted clock edges that corresponds to the amount of time.

When the count value of the count signal CNT is less than or equal to a first color coordinate count value CNTa, a color coordinate gain calculator 140 may output color coordinate gain signals GA_Wx and GA_Wy where an x-coordinate of a color space is 0.280 and where a y-coordinate of the color space is 0.285. In other words, the color coordinate gain signal GA_Wx may correspond to the x-coordinate of the color space, and the color coordinate gain signal GA_Wy may correspond to the y-coordinate of the color space.

When the count value of the count signal CNT is greater than the first color coordinate count value CNTa and is less than or equal to a second color coordinate count value CNTb, the color coordinate gain calculator 140 may output the color coordinate gain signals GA_Wx and GA_Wy where the x-coordinate of the color space changes gradually (or stage by stage) between from 0.280 to 0.270 and where the y-coordinate changes gradually (or stage by stage) between from 0.285 to 0.295, depending on the count value of the count signal CNT.

In an embodiment, the color coordinate gain calculator 140 may calculate the x-coordinate and the y-coordinate of the color space, which correspond to the count value of the count signal CNT, by means of a predetermined equation and may output the color coordinate gain signals GA_Wx and GA_Wy corresponding to the calculated x-coordinate and the calculated y-coordinate.

In an embodiment, the color coordinate gain calculator 140 may store the x-coordinate and the y-coordinate of the color space, which correspond to the count value of the count signal CNT, in a lookup table and may output the color coordinate gain signals GA_Wx and GA_Wy corresponding to the x-coordinate and the y-coordinate, which are read from the lookup table.

When the count value of the count signal CNT is greater than a second luminance count value CNT2, the color coordinate gain calculator 140 may output color coordinate gain signals GA_Wx and GA_Wy where the x-coordinate of the color space is 0.270 and where the y-coordinate is 0.295.

When the input image signal I_RGB of the current frame is determined as a moving image, the still image determiner 110 may output a still image signal ST of an inactive level (e.g., a low level). When the still image signal ST is transitioned from the active level to the inactive level, the count value of the count signal CNT output from the counter 120 may be reset to "0".

When the count value of the count signal CNT is "0", the color coordinate gain calculator 140 may output color coordinate gain signals GA_Wx and GA_Wy where the x-coordinate of the color space is 0.280 and where the y-coordinate is 0.285. In other words, when the input image signal I_RGB of the current frame is determined as a moving image, a driving controller 100 may return white color coordinates to the first color coordinates Wa illustrated in FIG. 5.

In an example illustrated in FIG. 4, when the count value of the count signal CNT is greater than the second luminance count value CNT2, a luminance gain calculator 130 may output a luminance gain signal GA_B of a second luminance gain level LV2. In an embodiment, the second luminance gain level LV2 may correspond to minimum luminance allowed by a display panel DP.

As described with reference to FIGS. 5 to 7, because the luminance of an image increases when the white color coordinates (Wx, Wy) change from the first color coordinates Wa to the second color coordinates Wb, even though the luminance gain signal GA_B changes to a value lower than the second luminance gain level LV2, a minimum luminance allowed by the display panel DP may be satisfied.

In other words, because the minimum luminance allowed by the display panel DP is able to be satisfied even though the data signal provided to the pixels PX11-PXnm changes to a lower gray level, power consumption may be reduced. For example, when current efficiency increases by 5%, and power consumption may decrease by 5%.

Furthermore, as the data signal provided to the pixels PX11-PXnm changes to the lower gray level, an afterimage phenomenon may also be reduced.

In an embodiment, the first color coordinate count value CNTa illustrated in FIG. 7 may be the same value as a first luminance count value CNT1 illustrated in FIG. 4, and the second color coordinate count value CNTb may be the same value as a second luminance count value CNT2 illustrated in FIG. 4.

In an embodiment, the first color coordinate count value CNTa illustrated in FIG. 7 may be a value different from the first luminance count value CNT1 illustrated in FIG. 4, and the second color coordinate count value CNTb may be a value different from the second luminance count value CNT2 illustrated in FIG. 4.

The first color coordinates Wa corresponding to the moving image illustrated in FIG. 5, the second color coordinates Wb corresponding to the still image, and the x-coordinate and the y-coordinate of the color coordinate gain signals GA_Wx and GA_Wy illustrated in FIG. 7 are merely examples provided to aid in understanding the description, and embodiments of the present disclosure are not limited thereto.

Figure 8:
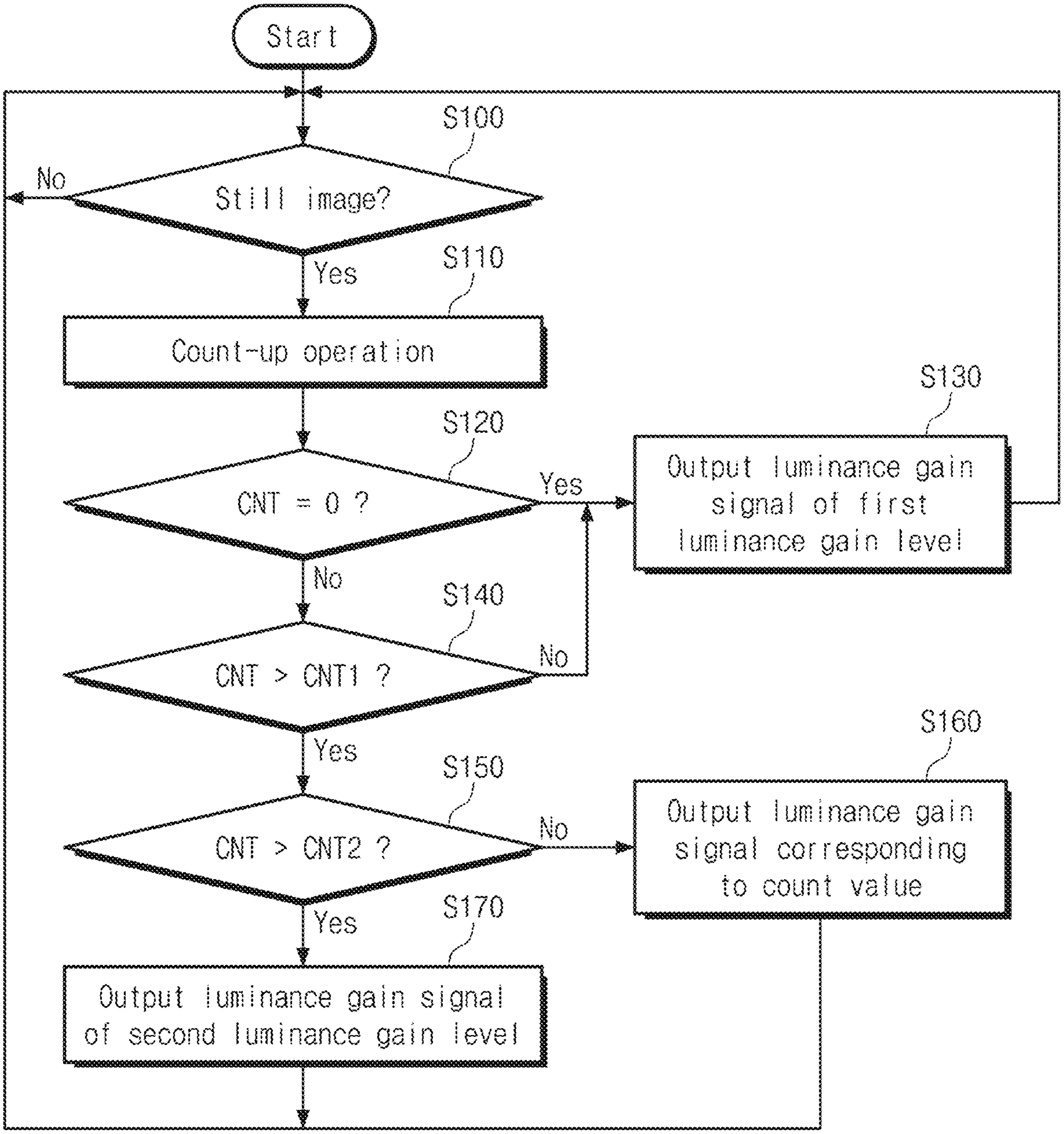
FIG. 8 is a flowchart illustrating an operation method of a display device according to an embodiment of the present disclosure.

FIG. 8 is a flowchart illustrating an operation method of a display device according to an embodiment of the present disclosure.

The flowchart illustrated in FIG. 8 illustratively shows a process where a luminance gain signal is output when an input image signal is a still image or a moving image.

The operation method of the display device will be described with reference to the display device illustrated in FIGS. 2 and 3 for convenience of description, but embodiments of the present disclosure are not limited thereto.

Referring to FIGS. 2, 3, 4, and 8, in operation S100, a still image determiner 110 (e.g., a logic circuit) determines whether an input image signal I_RGB of a current frame is a still image based on an input image signal I_RGB and a control signal CTRL. When the input image signal I_RGB of the current frame is the still image, the still image determiner 110 may output a still image signal ST in an active level. For example, the control signal CTRL may indicate the start of the current frame.

In operation S110, a counter 120 performs a count-up operation while the still image signal ST is maintained in the active level. For example, a value of the counter 120 may be incremented for each period or edge of a clock signal while the still image signal ST continues to indicate a still image.

A luminance gain calculator 130 may calculate a luminance gain in response to a count signal CNT of the counter 120 and may output a luminance gain signal GA_B based on the calculated luminance gain.

When a count value of the count signal CNT is "0" in operation S120, in operation S130, the luminance gain calculator 130 determines that the input image signal I_RGB of the current frame has changed to a moving image and outputs a luminance gain signal GA_B of a first luminance gain level LV1.

When the count value of the count signal CNT is not "0" in operation S120, in operation S140, the luminance gain calculator 130 determines whether the count value of the count signal CNT is greater than a first luminance count value CNT1. When the count value of the count signal CNT is not greater than the first luminance count value CNT1, in operation S130, the luminance gain calculator 130 outputs the luminance gain signal GA_B of the first luminance gain level LV1.

When the count value of the count signal CNT is greater than the first luminance count value CNT1 in operation S140, in operation S150, the luminance gain calculator 130 determines whether the count value of the count signal CNT is greater than a second luminance count value CNT2.

When the count value of the count signal CNT is not greater than the second luminance count value CNT2 (i.e., when the count signal CNT is greater than the first luminance count value CNT1 and is less than or equal to the second luminance count value CNT2), in operation S160, the luminance gain calculator 130 outputs the luminance gain signal GA_B corresponding to a count value of the count signal CNT. In an embodiment, the luminance gain signal GA_B corresponding to the count value of the count signal CNT has a value which is less than the first luminance gain level LV1 and is greater than the second luminance gain level LV2.

When the count value of the count signal CNT is greater than the second count value CNT2, in operation S170, the luminance gain calculator 130 outputs the luminance gain signal GA_B of the second luminance gain level LV2.

While a display device DD operates in a screen saver mode or a power-saving mode, a driving controller 100 may repeatedly perform operations S100 to S170 illustrated in FIG. 8.

In an embodiment, an output circuit 150 may convert the input image signal I_RGB into an output image signal O_RGB in response to the luminance gain signal GA_B. The output image signal O_RGB may be provided to a display panel DP through a data driving circuit 200.

Figure 9:
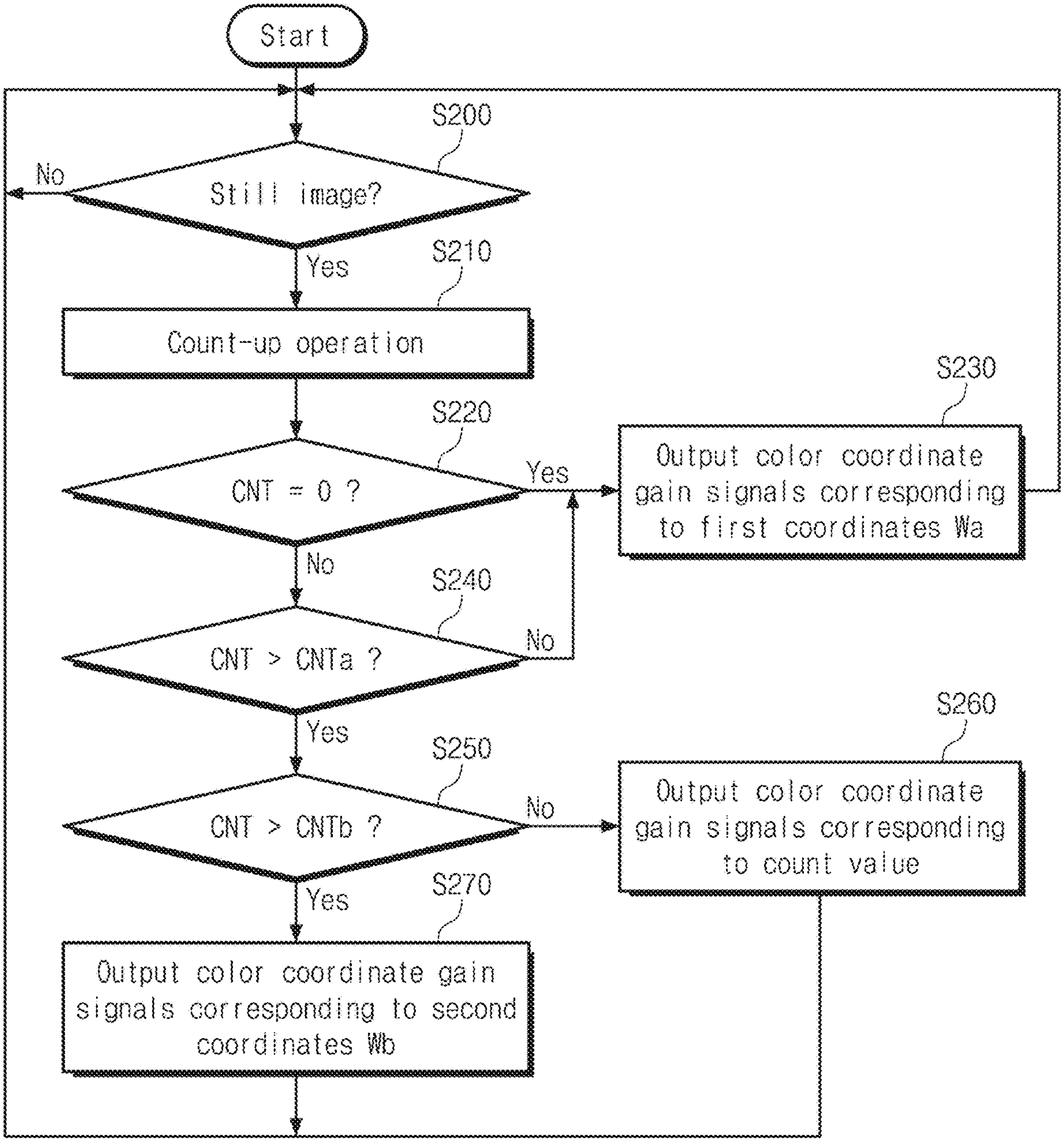
FIG. 9 is a flowchart illustrating an operation method of a display device according to an embodiment of the present disclosure.

FIG. 9 is a flowchart illustrating an operation method of a display device according to an embodiment of the present disclosure.

The flowchart illustrated in FIG. 9 illustratively shows a process where color coordinates gain signals are output when an input image signal is a still image or a moving image.

The operation method of the display device will be described with reference to the display device illustrated in FIGS. 2 and 3 for convenience of description, but the present disclosure is not limited thereto.

Referring to FIGS. 2, 3, 5, 7, and 9, in operation S200, a still image determiner 110 determines whether an input image signal I_RGB of a current frame is a still image based on an input image signal I_RGB and a control signal CTRL. When the input image signal I_RGB of the current frame is the still image, the still image determiner 110 may output a still image signal ST in an active level. For example, the control signal CTRL may indicate a start of the current frame.

In operation S210, a counter 120 performs a count-up operation while the still image signal ST is maintained in the active level. For example, the counter 120 may be incremented each time it detects that the current frame remains a still image.

A color coordinate gain calculator 140 may calculate color coordinate gains based on a count signal CNT and may output color coordinate gain signals GA_Wx and GA_Wy based on the calculated color coordinate gains.

When a count value of the count signal CNT is "0" in operation S220, in operation S230, the color coordinate gain calculator 140 may determine that the input image signal I_RGB of the current frame had changed to a moving image and may output color coordinate gain signals GA_Wx and GA_Wy corresponding to first color coordinates Wa.

When the count value of the count signal CNT is not "0" in operation S220, in operation S240, the color coordinate gain calculator 140 determines whether the count value of the count signal CNT is greater than a first color coordinate count value CNTa. When the count value of the count signal CNT is not greater than the first color coordinate count value CNTa, in operation S230, the color coordinate gain calculator 140 outputs the color coordinate gain signals GA_Wx and GA_Wy corresponding to the first color coordinates Wa.

When the count value of the count signal CNT is greater than the first color coordinate count value CNTa in operation S240, in operation S250, the color coordinate gain calculator 140 determines whether the count value of the count signal CNT is greater than a second color coordinate count value CNTb.

When the count value of the count signal CNT is not greater than the second color coordinate count value CNTb (i.e., when the count signal CNT is greater than the first color coordinate count value CNTa and is less than or equal to the second color coordinate count value CNTb), in operation S260, the color coordinate gain calculator 140 outputs the color coordinate gain signals GA_Wx and GA_Wy corresponding to a count value of the count signal CNT. In an example illustrated in FIG. 7, the color coordinate gain signal GA_Wx corresponding to the count value of the count signal CNT may correspond to a value, an x-coordinate of which changes gradually (or stage by stage) between from 0.280 to 0.270. In the example illustrated in FIG. 7, the color coordinate gain signal GA_Wy corresponding to the count value of the count signal CNT may correspond to a value, a y-coordinate of which changes gradually (or stage by stage) between from 0.285 to 0.295.

In an embodiment, when the count value of the count signal CNT is greater than the first color coordinate count value CNTa and is less than or equal to the second color coordinate count value CNTb, the color coordinate gain calculator 140 may output the color coordinate gain signals GA_Wx and GA_Wy such that color coordinates move in a greenish direction in a color space.

When the count value of the count signal CNT is greater than the second color coordinate count value CNTb, in operation S270, the color coordinate gain calculator 140 may output the color coordinate gain signals GA_Wx and GA_Wy corresponding to second color coordinates Wb.

While a display device DD operates in a screen saver mode or a power-saving mode, a driving controller 100 may repeatedly perform operations S200 to S270 illustrated in FIG. 9.

In an embodiment, an output circuit 150 may convert the input image signal I_RGB into an output image signal O_RGB in response to the color coordinates gain signals GA_Wx, GA_Wy. The output image signal O_RGB may be provided to a display panel DP through a data driving circuit 200.

In an embodiment, the output circuit 150 may convert the input image signal I_RGB into the output image signal O_RGB based on the luminance gain signal GA_B obtained by the operations illustrated in FIG. 8 and the color coordinate gain signals GA_Wx and GA_Wy obtained by the operations illustrated in FIG. 9. The output image signal O_RGB may be provided to the display panel DP through the data driving circuit 200.

The display device having such a configuration may reduce a luminance of a still image when the still image is displayed for a long time, thus reducing power consumption. Particularly, when white color coordinates move in a greenish direction, power consumption of the display device may be more reduced.

While the present disclosure has been described with reference to an embodiment thereof, it will be apparent to those of ordinary skill in the art that various changes and modifications may be made thereto without departing from the spirit and scope of the present disclosure as set forth in the following claims.

What is claimed is:

1. A display device, comprising:
- a driving control circuit which receives an input image signal and outputs an output image signal;
- a data driving circuit which outputs a data signal corresponding to the output image signal; and
- a display panel including a plurality of pixels and which displays an image corresponding to the data signal,
- wherein the driving control circuit comprises:
  - a logic circuit which outputs a still image signal of an active level when the input image signal is a still image; and
  - a counter which counts the amount of time when the still image signal is maintained in the active level and outputs a count signal based on the amount of time,
- wherein the driving control circuit determines a color coordinate gain based on the count signal and outputs the output image signal based on the color coordinate gain.

2. The display device of claim 1, wherein the driving control circuit comprises:
- a first calculator which calculates the color coordinate gain based on the count signal and outputs a color coordinate gain signal corresponding to the color coordinate gain; and
- an output circuit which converts the input image signal into the output image signal in response to the color coordinate gain signal.

3. The display device of claim 2, wherein the first calculator outputs the color coordinate gain signal corresponding to first color coordinates, when a count value of the count signal is less than or equal to a first color coordinate count value, and outputs the color coordinate gain signal corresponding to the count value of the count signal, when the count value of the count signal is greater than the first color coordinate count value and is less than or equal to a second color coordinate count value.

4. The display device of claim 3, wherein the first calculator outputs the color coordinate gain signal corresponding to second color coordinates, when the count signal is greater than the second color coordinate count value.

5. The display device of claim 4, wherein the color coordinate gain signal corresponds to color coordinates between the first color coordinates and the second color coordinates, when the count signal is greater than the first color coordinate count value and is less than or equal to the second color coordinate count value.

6. The display device of claim 4, wherein the second color coordinates are coordinates moving in a greenish direction from the first color coordinates in a color space.

7. The display device of claim 3, wherein the color coordinate gain signal includes a first color coordinate gain signal corresponding to an x-coordinate of a color space and a second color coordinate gain signal corresponding to a y-coordinate of the color space.

8. A display device, comprising:
- a driving control circuit which receives an input image signal and outputs an output image signal;
- a data driving circuit which outputs a data signal corresponding to the output image signal; and
- a display panel including a plurality of pixels and which displays an image corresponding to the data signal,
- wherein the driving control circuit comprises:
  - a logic circuit which outputs a still image signal of an active level when the input image signal is a still image; and
  - a counter which counts the amount of time when the still image signal is maintained in the active level and outputs a count signal based on the amount of time,
- wherein the driving control circuit determines a luminance gain and a color coordinate gain based on the count signal and outputs the output image signal based on the luminance gain and the color coordinate gain.

9. The display device of claim 8, wherein the driving control circuit comprises:
- a first calculator which calculates the luminance gain based on the count signal and outputs a luminance gain signal corresponding to the luminance gain;
- a second calculator which calculates the color coordinate gain based on the count signal and output a color coordinate gain signal corresponding to the color coordinate gain; and
- an output circuit which converts the input image signal into the output image signal in response to the color coordinate gain signal.

10. The display device of claim 9, wherein the first calculator outputs the luminance gain signal corresponding to a first luminance gain level, when a count value of the count signal is less than or equal to a first luminance count value, and outputs the luminance gain signal corresponding to the count value of the count signal, when the count value of the count signal is greater than the first luminance count value and is less than or equal to a second luminance count value.

11. The display device of claim 10, wherein the first calculator outputs the luminance gain signal corresponding to a second luminance gain level, when the count value of the count signal is greater than the second luminance count value.

12. The display device of claim 11, wherein the luminance gain signal corresponds to a luminance gain level between the first luminance gain level and the second luminance gain level, when the count value of the count signal is greater than the first luminance count value and is less than or equal to the second luminance count value.

13. The display device of claim 10, wherein the second calculator outputs the color coordinate gain signal corresponding to first color coordinates, when the count value of the count signal is less than or equal to a first color coordinate count value, and outputs the color coordinate gain signal corresponding to the count value of the count signal, when the count value of the count signal is greater than the first color coordinate count value and is less than or equal to a second color coordinate count value.

14. The display device of claim 13, wherein the first calculator outputs the color coordinate gain signal corresponding to second color coordinates, when the count value of the count signal is greater than the second color coordinate count value.

15. The display device of claim 14, wherein the color coordinate gain signal corresponds to color coordinates between the first color coordinates and the second color coordinates, when the count value of the count signal is greater than the first color coordinate count value and is less than or equal to the second color coordinate count value.

16. The display device of claim 14, wherein the second color coordinates are coordinates moving in a greenish direction from the first color coordinates in a color space.

17. The display device of claim 9, wherein the color coordinate gain signal includes a first color coordinate gain signal corresponding to an x-coordinate of a color space and a second color coordinate gain signal corresponding to a y-coordinate of the color space.

18. An operation method of a display device, the operation method comprising:

determining whether an input image signal is a still image;

counting, by a counter, an amount of time the input image signal is maintained as the still image to generate a count signal;

calculating a color coordinate gain based on the count signal; and converting the input image signal into an output image signal based on the color coordinate gain.

19. The operation method of claim 18, further comprising:

calculating a luminance gain based on the count signal; and converting the input image signal into the output image signal based on the luminance gain and the color coordinate gain.

20. The operation method of claim 19, wherein the calculating of the color coordinate gain based on the count signal comprises:

calculating the color coordinate gain such that color coordinates move in a greenish direction in a color space as a count value of the count signal increases.

21. The display device of claim 1, wherein the color coordinate gain gradually increases or decreases when the amount of time is greater than a count of the count signal and the color coordinate gain has a constant level when the amount of time is less than or equal to the count.

22. The operation method of claim 18, wherein the color coordinate gain gradually increases or decreases when the amount of time is greater than a count of the count signal and the color coordinate gain has a constant level when the amount of time is less than or equal to the count.

* * * * *